Feb. 28, 1956
E. E. HEWITT
2,736,394
TORQUE CONTROLLED BRAKE
Filed Dec. 18, 1952
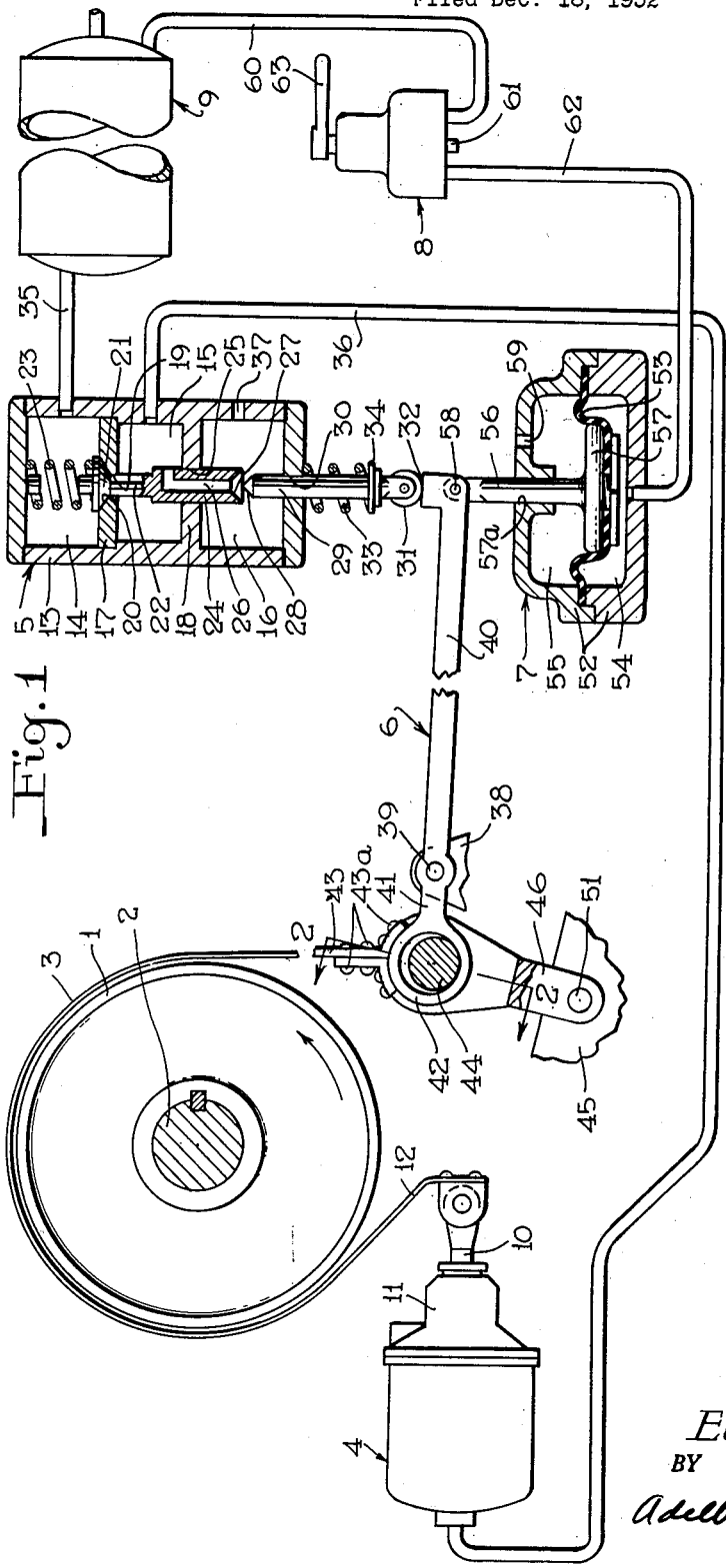
INVENTOR.
*Ellis E. Hewitt*
BY
*Adelbert A. Steinmiller*
ATTORNEY United States Patent Office 2,736,394
Patented Feb. 28, 1956

2,736,394

TORQUE CONTROLLED BRAKE

Ellis E. Hewitt, Westmoreland, Pa., assignor to Westinghouse Air Brake Company, Wilmerding, Pa., a corporation of Pennsylvania Application December 18, 1952, Serial No. 326,640

2 Claims. (Cl. 188—151)

This invention relates to fluid pressure brake systems which includes means for automatically controlling the degree of application of the brakes according to the brake torque developed by said application, and more particularly to such a system as employs a brake band for braking a hoisting drum or the like which rotates in only one direction during braking.

The principal object of the invention is to provide an improved and simplified brake system of the above type.

Other objects and advantages of the invention will become apparent from the following more detailed description thereof.

In the accompanying drawing; Fig. 1 is a side elevational view, partly in outline and partly in section, of a brake system embodying my invention; and Fig. 2 is a sectional view taken along the line 2—2 in Fig. 1.

Referring to Fig. 1 of the drawing, the automatically torque controlled fluid pressure brake system, embodying my invention, comprises a brake drum 1, connected for rotation with a shaft 2 which rotates in only one direction, such as counter-clockwise, during braking; a brake band 3 concentrically arranged about the outer periphery of the drum 1 and adapted to be drawn into frictional engagement therewith; a brake cylinder device 4 operable by fluid under pressure for actuating the band 3; a valve device 5 for controlling supply and release of fluid under pressure to and from the brake cylinder device 4; a rockable lever 6 connected at one end to the band 3 and operatively connected at the other end to the valve device 5; a pressure responsive device 7 operatively connected to the lever 6; and operator's control valve device 8 to control operation of the device 7; and a reservoir 9 for storing fluid under pressure for supply to the system.

The brake cylinder device 4 may be of well-known construction, comprising the usual piston (not shown) to which is attached a piston rod 10 extending exteriorly of a nonpressure head 11, which rod at its projecting end is operatively connected to the live end 12 of the brake band 3 for effecting frictional engagement of said band with the drum 1 upon actuation of said piston by fluid under pressure supplied to said brake cylinder device.

The valve device 5, for sake of illustration, may comprise a cylindrical casing 13, having formed therein a supply chamber 14, a lap chamber 15 and an exhaust chamber 16, said lap chamber being intermediate said supply and exhaust chambers and separated therefrom by partitions 17 and 18, respectively.

A central opening 19 is provided in the partition 17 to establish communication between the supply and lap chambers 14 and 15. The supply chamber end of the opening 19 is tapered outwardly to form a tapered seat 20 to accommodate seating engagement of a supply valve 21 disposed in the supply chamber 14. A fluted stem 22, slidably guided within the opening 19, extends interiorly of the lap chamber 15 and is attached to one end of the valve 21 to act as a medium through which the valve 20 may be actuated. A compression spring 23 disposed in the supply chamber 14 is arranged to urge movement of the supply valve 21 into engagement with its seat 20. The end of the fluted stem 22 which projects into the lap chamber 15 is attached to one end of a release valve seat element 24. The element 24 extends through a central opening 25 in the partition 18 and projects into the exhaust chamber 16, said element being in slidable sealing engagement with the wall of said opening.

An exhaust passage 26 extends longitudinally through the element 24 to permit release of fluid under pressure from the lap chamber 15 to the exhaust chamber 16. One end of the passage 26 opens radially outward into the lap chamber 15; and its opposite end opens centrally through the projecting end of the element 24, tapering outwardly into the exhaust chamber 16, thereby forming a tapered release valve seat 27 to accommodate a tapered release valve 28 disposed in said exhaust chamber.

The release valve 28 is attached to one end of an actuating rod 29 which extends outwardly through an opening 30 in the casing 13 to the exterior thereof. The opening 30 is in alignment with the release valve seat element 24 and slidably guides movement of the rod 29 to direct movement of the release valve 28 relative to the seat 27 to assure proper seating engagement therebetween.

The outermost end of rod 29 is provided with a roller follower 31 for operable engagement with a suitable follower surface 32 formed at one end of the lever 6. A compression spring 33 encircling the rod 29 is interposed between the casing 13 and an annular spring retaining element 34 suitably attached to said rod to maintain engagement of the follower 31 with the surface 32 and bias the lever 6 in a particular direction of rockable movement, for reasons which will hereinafter become apparent.

In operation of the valve device 5, when the actuating rod 29 is so disposed that the release valve 28 is out of seating engagement with the tapered seat 27 of release valve seat element 24, the lap chamber 15 will be in communication with the exhaust chamber 16 via the passage 26 in said element 24, and the supply valve 21 will be held by the spring 23 in engagement with the seat 20 in the partition 17, thereby closing off said lap chamber from the supply chamber 14. When movement of the actuating rod 29 brings the release valve 28 into engagement with the seat 27, communication via opening 26 between chambers 15 and 16 is thereby terminated. Subsequent continued movement of the actuating rod 29 in the same direction, through engagement between the release valve 28 with the seat 27, causes the release valve seat element 24 to be slidably moved in opposition to action of spring 23 to unseat the supply valve 21 and thereby establish communication between the supply chamber 14 and lap chamber 15 via the opening 19 in partition 17 while said lap chamber remains closed to the exhaust chamber 16. Subsequent movement of the actuating rod 29 in the opposite direction allows the spring 23 to move the supply valve 21 into seating engagement with the seat 20, while the release valve 28 remains in engagement with the seat 27, thereby closing off the lap chamber 15 from both the supply chamber 14 and exhaust chamber 16. Upon subsequent continued movement of the rod 29 in the same direction, the release valve seat element 24 will be restrained from movement with the rod 29 by engagement of the supply valve 21 with the seat 20 and the release valve 28 will be carried out of contact with the seat 27 to again establish communication between the lap chamber 15 and the exhaust chamber 16.

In the valve device 5 the supply chamber 14 is connected to the reservoir 9 by way of a pipe 35, the lap chamber 15 is in constant communication with the brake cylinder device 4 by way of a pipe 36, and the exhaust chamber 16 is constantly open to the atmosphere by way of a port 37 formed in the casing 13.

The lever 6 is substantially straight and is fulcrumed intermediate its ends about a fixed element 38 through the medium of a pin 39 to act as a simple weighing beam. The lever 6 comprises two arms 40 and 41, extending in opposite directions from the pin 39, the arm 40 preferably being longer than the arm 41 to provide the necessary leverage ratio according to design.

A ring 42 is attached to the end of arm 41, the axis of said ring being parallel to the axes of the pin 39 and the shaft 2. The dead end 43 of the brake band 3 is operatively attached, as by rivets 43a, to the periphery of ring 42 at a point such that said band will extend in a direction which is substantially perpendicular to the axis of lever 6 and within the plane of its rockable movement to subject said lever to a moment which will tend to rock said lever in a clockwise direction, as viewed in the drawing, according to the torque developed on said band by application of the brakes. A stop element in the form of a pin 44 extends in an axial direction through the bore of the ring 42 with radial clearance to provide for a limited degree of rockable movement of the lever 6 as defined by contact of said ring with said pin.

Referring also to Fig. 2 of the drawing, the pin 44 is anchored to a fixed member 45 through the medium of a yoke 46. Divided arms 47 of the yoke 46 are disposed at opposite ends of the ring 44 and accommodate opposite extending ends of the pin 44 within appropriate aligned bores 48. The usual washer 49 and cotter pin 50 arrangement is provided at each end of the pin 44 to maintain same disposed within the bores 48. Referring again exclusively to Fig. 1 of the drawing, a pin 51 pivotally connects the junction end of the yoke 46 to the fixed member 45.

For sake of illustration, the pressure responsive device 7 comprises a hollow divided casing 52 between portions of which is clamped a resilient diaphragm 53 which divides the interior of said casing into a pressure chamber 54 at one side and a non-pressure chamber 55 at its opposite side. The diaphragm 53 is operatively connected to one end of a stem 56 through the medium of the usual follower 57 suitably attached to said diaphragm. The stem 56 extends through the non-pressure chamber 55 and exteriorly of the casing 52 through a suitable opening 57a formed therein. At its projecting end, the stem 56 is operatively connected by a pin 58 to the outermost end of the lever arm 40 on the side thereof opposite the flat surface 32. The axis of the stem 56 is disposed substantially perpendicular to the longitudinal axis of the lever 6 and within the plane of its rockable movement such that any thrust force transmitted from said stem to said lever will oppose the effect of any torque exerted via the brake band 3 on said lever as well as the effect on the lever of the bias spring 33 in valve device 5. The non-pressure chamber 55 is constantly open to the atmosphere by way of a port 59 formed in casing 52.

The operator's control valve device 8 is preferably of the self-lapping type and my be similar to that disclosed in the U. S. Patent No. 2,042,112 issued May 26, 1936 to Lynn and Bush and assigned to the assignee of the present application. For detailed description of the device 8 reference may be made to the above identified patent, and only those details of said device will be included herein as will enable an understanding of this invention. The valve device 8 is adapted to be supplied with fluid under pressure from the reservoir 9 by way of a pipe 60 and to release fluid under pressure to the atmosphere by way of a pipe 61 and is further adapted to convey fluid under pressure to and from the pressure chamber 54 of the device 7 by way of a pipe 62. The valve device 8 comprises valve means (not shown) to regulate the pressure of fluid in the pipe 62 according to position of an operator's handle 63, by supply of fluid under pressure thereto from the pipe 60 or release therefrom by way of the pipe 61.

Operation

In operation, assume that all the components of the brake system are in their brake released positions in which they are shown in the drawing, as a consequence of position of the handle 63 of the operator's control valve device 8 whereby the pipe 62 and consequently the pressure chamber 54 of the pressure responsive device 7 are devoid of fluid under pressure, and therefore no thrust is exerted by the stem 56 of device 7 on the lever arm 40.

In such position, the lever 6 is disposed in its limit position defined by contact of the ring 42 with the under surface of the pin 44, and held in such position by pressure of the spring 33 exerted on the follower 31 and transmitted thereby to the lever arm 40. The actuating rod 29 of valve device 5, by virtue of position of lever 6, is so disposed that the release valve 28 attached to said rod is disengaged from the seat element 24 while the supply valve 21 is held in its seated position by action of spring 23, as previously described in detail. With the supply valve 21 thus seated and the release valve 28 unseated, the brake cylinder device 4 is vented to atmosphere by way of the pipe 36, and, in device 5, the lap chamber 15, open passage 26, exhaust chamber 16 and port 37, and consequently the band 3 is disengaged from the drum 1. Since no braking torque is being applied to the drum 1 by the band 3, said band exerts no force on the ring 42, which, as previously stated, is therefore biased solely by the aforesaid action of spring 33.

Referring to Fig. 1 of the drawing, assume that the drum 1 is rotating in a counter-clockwise direction and that it is desired to apply the brakes to restrain rotation of said drum, the operator manually moves the handle 63 of the control valve device 8 into a position corresponding to the degree of braking desired to effect supply of fluid under pressure from reservoir 9 to the pressure chamber 54 of the pressure responsive device 7 to pressurize said chamber in accordance with selected handle position. In response to pressure of fluid thus supplied to chamber 54, the diaphram 53 deflects in the direction of the non-pressure chamber 55, causing the follower 57 carried with said diaphragm to advance the stem 56 exteriorly of the casing 52, thereby rocking the lever 6 about the pin 39 in a counter-clockwise direction, as viewed in Fig. 1 of the drawing, against pressure of the spring 33 exerted on said lever through the medium of the follower 31. During such rocking, the lever 6 leaves its previously defined limit position in which the ring 42 is in contact with the under surface of the pin 44 and assumes its opposite limit position defined by contact of said ring with the upper surface of said pin, causing the actuating rod 29 carried therewith to successively seat the release valve 28 and unseat the supply valve 21 to close off lap chamber 15 from the exhaust chamber 16 and open said lap chamber to the supply chamber 14, as previously described in detail. Fluid under pressure then will flow from the reservoir 9 to the brake cylinder device 4 via the pipe 35, the opening 19 exposed by the unseated supply valve 21, chamber 15 and the pipe 36, causing the piston rod 10 to advance exteriorly of the non-pressure head 11 and contract the brake band 3 into frictional engagement with the rotating drum 1, thereby applying a braking force to said drum and the shaft 2.

As the brake torque resultant from such application increase, due to the hitherto described supply of fluid under pressure to the brake cylinder device 4, the drum 1, as it rotates in a counter-clockwise direction, tends to carry the band 3 in the same direction about said drum which causes a tension force to be developed in said band reactive to the brake torque developed on said drum. Since the band 3 transmits this torque force to the ring 42 operably connected thereto, the position of the lever 6 will be determined by the correlative effects on said lever of said torque force assisted by the bias action of spring 33, both tending to rock said lever in a clockwise direction, and the operator-controlled manually adjustable force exerted by stem 56 of device 7, tending to rock said lever in the opposite direction.

When the effect of the torque force, as assisted by the spring 33, increases sufficiently to overcome the opposing effect of the operator-controlled force, the lever 6 will be rocked into its neutral position, in which the supply valve 21 and release valve 28 will be seated to terminate supply of fluid under pressure to the brake cylinder device 4 and lap the pressure of fluid in said brake cylinder device. The system will then be in equilibrium, with the braking torque opposing rotation of the drum 1 in accordance with the degree of such torque called for by position of the operator's control valve handle 63.

Now assume that with the pressure in the brake cylinder device 4 lapped, the braking torque increases above its called for value as a result, for example, of increased coefficient of friction between the band 3 and drum 1 due to decreased drum velocity during the brake application. The resultant increase in brake torque force will temporarily destroy equilibrium of the system and cause the lever 6 to rock in a clockwise direction, in turn causing the release valve 28 to be unseated by recession of the rod 29 and the brake cylinder device 4 thereby to be vented sufficiently to restore said lever to its neutral position, in which the system will again be in equilibrium.

Assume now that with the pressure of fluid lapped in the brake cylinder device 4, the braking torque decreases below the value called for, as a result, for example, of decreased co-efficient of friction between the band 3 and drum 1 due to increase in drum velocity during the brake application. The resultant decrease in brake torque force will temporarily destroy equilibrium of the system and cause the lever 6 to rock in a counter-clockwise direction and, through the medium of the actuating rod 29, effect admission of fluid under pressure to the brake cylinder device 4 to increase the pressure therein and consequently the braking torque sufficiently to return said lever to its neutral position in which the pressure of fluid in said brake cylinder device will once again be lapped and the system restored to equilibrium.

It will thus be seen that the system will function to effect initial brake application according to the degree of braking torque desired by the operator and thereafter automatically control and maintain the braking torque at the operator's selected value.

Assume now, that with the system in equilibrium, the operator, after having initially selected a certain degree of braking, desires to increase the braking torque. He will again manually move the handle 63 to cause the control valve device 8 to increase the pressure of fluid in the chamber 54 of the device 7. The resultant increase in force exerted on the lever 6 by the stem 56 of device 7 will temporarily destroy the equilibrium of the system, and rock said lever into the positoin for supplying additional fluid under pressure to the brake cylinder device 4, thereby increasing the braking force applied to the drum 1 by the band 3, and consequently increasing the braking torque and the torque force applied to lever 6 via ring 42. Equilibrium will be restored, in the manner previously described, when the effect of the increased torque force, as assisted by pressure of spring 33, overcomes the increased effect of the operator-controlled force and causes the lever to return to its neutral position in which pressure of fluid in the brake cylinder device 4 will be lapped. If the operator, on the other hand, desires to reduce the degree of braking torque, he will move the handle 63 in the direction of its brake released position, thereby reducing the pressure of fluid in chamber 54 and causing the lever 6 to rock into position for venting the brake cylinder device 4 to relieve the braking torque and hence the torque force until equilibrium is again restored, as previously described in detail.

When it is desired to release the brakes, the operator manually returns the handle 63 to its brake released position, thereby venting fluid under pressure from the pipe 62 and consequently from the pressure chamber 54 of the device 7. As fluid under pressure is thus vented from chamber 54, the stem 56 will no longer exert thrust on the lever 6, and the effect of the aforementioned torque force, assisted by action of spring 33, will cause said lever to rock into its limit position defined by contact of ring 42 with the under surface of the pin 44. This in turn will cause the actuating rod 29 to recede exteriorly of the casing 13 under action of spring 33 opening the passage 26 while the supply valve 21 is fully seated, and thereby venting the pipe 36 and brake cylinder device 4, in the manner previously described in detail.

*Summary*

From the foregoing it will be apparent that I have provided a relatively simple, inexpensive torque-controlled brake equipment. By virtue of the simplicity of my equipment same may be incorporated into the usual type of band brake apparatus simply by suitably connecting the dead end of the usual brake band to the one end of my rockable balance lever in order to achieve the automatic torque control feature.

Having now described my invention, what I claim as new and desire to secure by Letters Patent, is:

1. Brake apparatus for controlling braking force applied to a rotatable element, comprising in combination, a brake band adapted for frictional engagement with the periphery of said rotatable element; fluid pressure operated brake applying means operatively connected to the live end of said brake band; a valve device having an actuating rod normally in position for effecting operation of said valve device to vent said brake means but movable to effect operation of said valve device to lap the pressure in said brake means and upon further movement to effect operation of said valve device to supply fluid under pressure to said brake means; a lever fulcrumed intermediate its ends, for controlling, according to its rockable position, the movement of said valve device actuating rod, and normally biased toward one limit position of its rockable movement and movable toward another limit position of its rockable movement in which such actuating rod is in supply position, said lever being movable to said one limit position by bias means when said brake means is devoid of fluid under pressure and also returnable toward said one limit position by braking torque developed on said band by said brake applying means, one end of said lever being operably connected to the opposite end of said band; fluid pressure operated means to exert a moment on said lever for moving said valve device actuating rod into supply position in opposition to action of said brake torque on said lever; and a control valve manually adjustable to regulate pressure of fluid in said pressure responsive device according to the degree of braking desired.

2. Brake apparatus for a rotatable member comprising, in combination, a braking element for frictional braking engagement with said member, brake cylinder means operable by fluid under pressure for urging said braking element into braking engagement with said member, valve means operative in one position to vent fluid under pressure from said brake cylinder means, in another position to supply fluid under pressure to said brake cylinder means and in an intermediate position to bottle up fluid under pressure in said brake cylinder means, a fixed fulcrum, a lever rockable on said fulcrum and connected to said braking element and operable toward a normal position by torque on said braking element, developed by frictional engagement with said member, and operative upon movement out of said normal position to urge said valve means toward said other position, other means operable by fluid under pressure for moving said lever out of said normal position in opposition to such torque, means operative upon release of fluid under pressure from said other means to actuate said lever to said normal position and effect movement of said valve means to said one position, and an operator's control valve device for controlling pressure of fluid in said other means.

References Cited in the file of this patent

UNITED STATES PATENTS

| | | |
|---|---|---|
| 2,014,903 | Logan | Sept. 17, 1935 |
| 2,212,408 | Stewart | Aug. 20, 1940 |
| 2,243,449 | Aikman | May 27, 1941 |
| 2,279,433 | Logan, Jr. | Apr. 14, 1942 |
| 2,522,933 | Engelmann | Sept. 19, 1950 |